US010810658B2

(12) United States Patent
Haparnas et al.

(10) Patent No.: US 10,810,658 B2
(45) Date of Patent: Oct. 20, 2020

(54) SYSTEM FOR DISTRIBUTING MERCHANDISE TO PASSENGERS OF A TAXI SERVICE

(71) Applicant: Lyft, Inc., San Francisco, CA (US)

(72) Inventors: Ziv Haparnas, Bellevue, WA (US); Talmon Marco, Tel Aviv (IL)

(73) Assignee: LYFT, INC., San Francisco, CA (US)

( * ) Notice: Subject to any disclaimer, the term of this patent is extended or adjusted under 35 U.S.C. 154(b) by 1160 days.

(21) Appl. No.: 14/935,618

(22) Filed: Nov. 9, 2015

(65) Prior Publication Data

US 2017/0132696 A1    May 11, 2017

(51) Int. Cl.
*G06Q 30/06* (2012.01)
*G06Q 50/32* (2012.01)

(52) U.S. Cl.
CPC ..... *G06Q 30/0645* (2013.01); *G06Q 30/0635* (2013.01); *G06Q 50/32* (2013.01)

(58) Field of Classification Search
CPC . G06Q 30/0645; G06Q 30/0635; G06Q 50/32
USPC .......................................................... 705/13
See application file for complete search history.

(56) References Cited

U.S. PATENT DOCUMENTS

| 9,224,137 | B1* | 12/2015 | Tomasi | G07F 17/16 |
| 2005/0289032 | A1* | 12/2005 | Hoblit | G07F 7/06 |
| | | | | 705/35 |
| 2015/0142621 | A1* | 5/2015 | Gray | G06Q 10/087 |
| | | | | 705/28 |
| 2015/0310532 | A1* | 10/2015 | Gura | G06O 50/30 |
| | | | | 705/7.13 |
| 2016/0283999 | A1* | 9/2016 | Toya | G06Q 30/0625 |
| 2016/0364678 | A1* | 12/2016 | Cao | G06Q 50/30 |
| 2017/0038948 | A1* | 2/2017 | Cun | G06F 3/017 |
| 2017/0052034 | A1* | 2/2017 | Magazinik | G01C 21/3438 |
| 2017/0140183 | A1* | 5/2017 | Rinehart | G06K 7/10366 |

OTHER PUBLICATIONS

Ryan Waniata, "Hidden Radio Review", Feb. 14, 2013, https://web.archive.org/web/20130216070002/https://www.digitaltrends.com/wireless-speaker-reviews/hidden-radio-review/, (Year: 2013).*
Ryan Waniata, "Hidden Radio Review", Feb. 14, 2013, https://web.archive.org/web/20130216070002/https://www.digitaltrends.com/wireless-speaker-reviews/hidden-radio-review/, (Year: 2013) (Year: 2013).*
Kelly, Heather; "Lyft cars get creative—and a little weird"; CNNTech; Jul. 29, 2013 (Year: 2013).*
Waniata, Ryan; "Hidden Radio Review"; Digital Trends; Feb. 14, 2013 (Year: 2013).*

* cited by examiner

*Primary Examiner* — Rupangini Singh
*Assistant Examiner* — Dione N. Simpson
(74) *Attorney, Agent, or Firm* — Keller Jolley Preece (57) ABSTRACT

In one embodiment a transportation request is received from a passenger having an account with a taxi service. A driver associated with the taxi service is directed to pick up the passenger and transport the passenger to a location specified by the passenger. It is determined that the passenger should be offered an item of merchandise to use temporarily. In response to the passenger accepting the item of merchandise, an update is sent to a data store, the update indicating that the passenger is in possession of the item of merchandise.

20 Claims, 5 Drawing Sheets

| 402 | 404 | 406 | 408 | 410 | 412 |
|---|---|---|---|---|---|
| | ITEM BORROWED: | DATE BORROWED: | DATE DUE: | LATE FEE/DAY | MAXIMUM LATE FEE |
| PASSENGER 1 | UMBRELLA | 10/21/2015 | 10/28/2015 | 1.00 | 15.00 |
| PASSENGER 2 | UMBRELLA; POWER BANK | 10/15/2015; 10/15/2015 | 10/22/2015; 10/22/2015 | 1.00; 0.75 | 15.00; 10.00 |
| PASSENGER 3 | MICRO USB CHARGER | 10/18/2015 | 10/22/2015 | 1.50 | 15.00 |
| PASSENGER 4 | UMBRELLA | 10/20/2015 | 11/3/2015 | 0.50 | 15.00 |

FIG. 5

| 502 | 504 | 506 | 508 | 510 |
|---|---|---|---|---|
| | UMBRELLAS | LIGHTING CHARGER | MICRO USB CHARGER | POWER BANK |
| DRIVER 1 | 6 | 10 | 10 | 4 |
| DRIVER 2 | 0 | 5 | 4 | 2 |
| DRIVER 3 | 3 | 4 | 6 | 1 |
| DRIVER 4 | 1 | 8 | 9 | 2 |

FIG. 6

SYSTEM FOR DISTRIBUTING MERCHANDISE TO PASSENGERS OF A TAXI SERVICE

TECHNICAL FIELD

This disclosure relates in general to the field of mobile applications and, more particularly, to a system for distributing merchandise to passengers of a taxi service.

BACKGROUND

A taxi service may utilize a plurality of drivers that fulfill passenger requests for transportation. A taxi service may provide one or more mobile applications that facilitate the efficient pairing of passengers and drivers. The taxi service may receive a passenger request and select a driver to fulfill the request based on information associated with the passenger request and information associated with the driver.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

In one embodiment a transportation request is received from a passenger having an account with a taxi service. A driver associated with the taxi service is directed to pick up the passenger and transport the passenger to a location specified by the passenger. It is determined that the passenger should be offered an item of merchandise to use temporarily. In response to the passenger accepting the item of merchandise, an update is sent to a data store, the update indicating that the passenger is in possession of the item of merchandise.

EXAMPLE EMBODIMENTS

Figure 1:
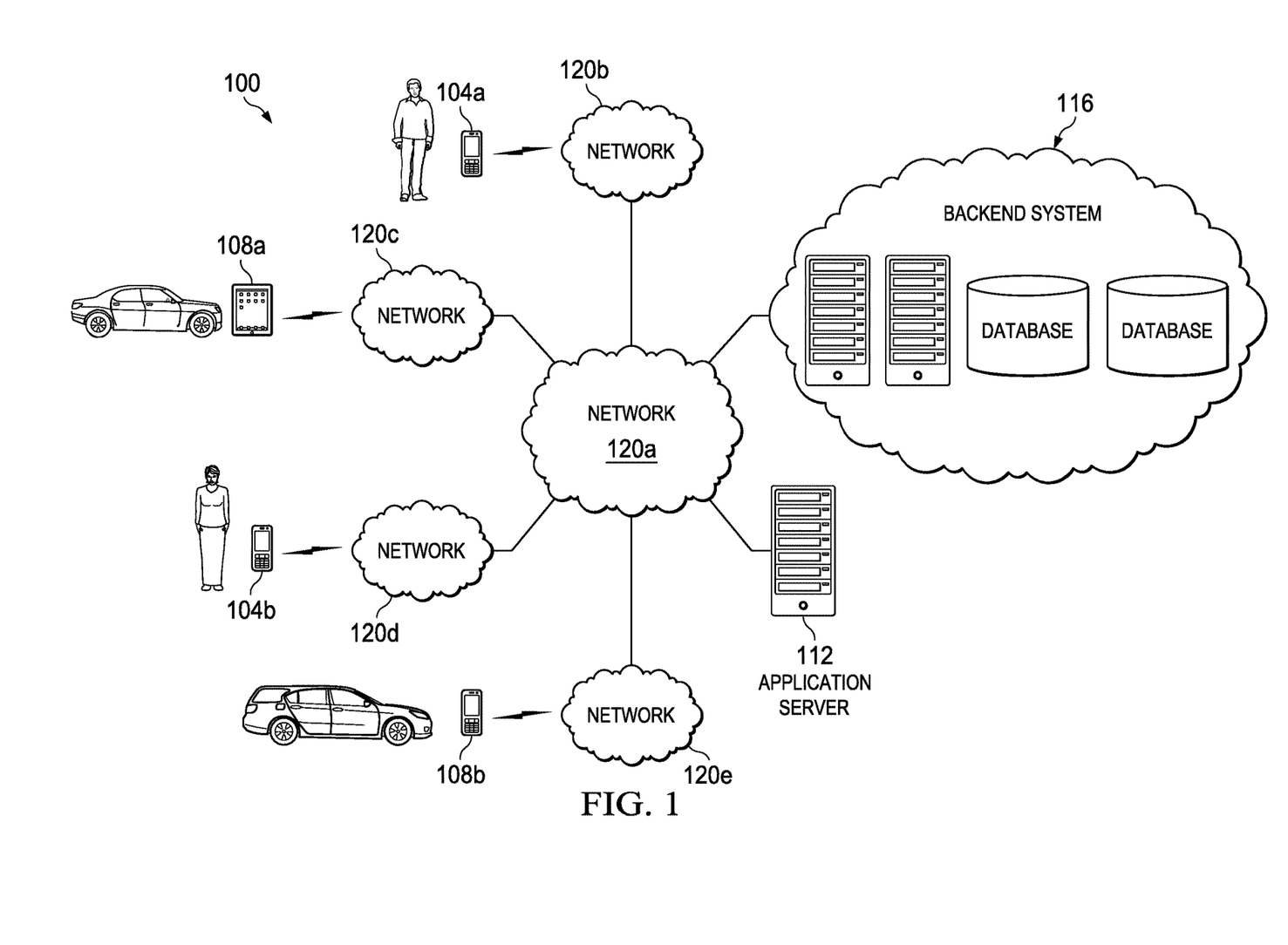
FIG. 1 illustrates a block diagram of a system for distributing merchandise to passengers of a taxi service in accordance with certain embodiments.

FIG. 1 illustrates a block diagram of a system for distributing merchandise to passengers of a taxi service in accordance with certain embodiments. Although various embodiments may include any number of drivers, passengers, and associated devices, system 100 depicts two passengers having associated passenger mobile devices 104 and two drivers having associated driver mobile devices 108. The mobile devices are coupled through various networks 120 to an application server 112 and a backend system 116.

Various embodiments of the present disclosure may enhance the experience of passengers associated with a taxi service by allowing them to borrow merchandise from the taxi service temporarily. For example, a passenger may check out an umbrella or phone charger from a driver of the taxi service following a ride provided by the driver, use the items for a period of time, and return the items to another driver of the taxi service or to a designated location. In particular embodiments, a determination of whether to offer a passenger merchandise may be based on various factors, such as the amount of remaining merchandise in a vehicle, the loyalty of the passenger, detected conditions (such as the weather or the battery state of a mobile device of the passenger), or other suitable factors.

Mobile devices 104 and 108 may include any electronic computing device operable to receive, transmit, process, and store any appropriate data. For example, mobile devices 104 and 108 may include laptop computers, tablet computers, smartphones, personal digital assistants, and other devices capable of connecting (e.g., wirelessly) to one or more networks 120. Mobile devices 104 and 108 may include a set of programs such as operating systems (e.g., Microsoft Windows, Linux, Android, Mac OSX, Apple iOS, UNIX, or similar operating system), applications, plug-ins, applets, virtual machines, machine images, drivers, executable files, and other software-based programs capable of being run, executed, or otherwise used by the respective devices. Each mobile device can include at least one graphical display and user interface allowing a user to view and interact with applications and other programs of the mobile device. In a particular embodiment, a driver mobile device may be a hardened device that is configured to only run a taxi driver application using a specialized operating system (e.g., a modified version of Android). In one embodiment, a taxi service may issue or otherwise facilitate the provision of hardened devices to its drivers, but restrict the functionality of the devices to the taxi driver application (i.e., the devices may be locked down so as not to allow the installation of additional applications).

In various embodiments, a driver mobile device 108 may be integrated within and/or communicate with a self-driven vehicle (e.g., a vehicle that has the capability of driving without physical steering guidance from a human being) and may influence the movement of the vehicle by providing route information (e.g., passenger pick-up and destination locations or driver destination locations) to the self-driven vehicle. Accordingly, as used herein "driver" may refer to a human being that may physically drive or otherwise control movement of a vehicle or the vehicle itself (e.g., in the case of a self-driven vehicle) or component thereof (e.g., mobile device application 108 or logic therein).

In particular embodiments, a taxi passenger application runs on passenger mobile devices 104. The application may allow a user to enter various account information (e.g., in connection with a registration with the taxi service) to be utilized by a taxi service. For example, the account information may include a user name and password (or other login credentials), contact information of the user (e.g., phone number, home address), payment information (e.g., credit card numbers or bank account numbers and associated information), or car preference information (e.g., what models or color of car the user prefers).

The application may allow a user to request a ride from the taxi service. In various embodiments, the application may establish a pick-up location automatically or based on user input (e.g., locations may include the current location of the mobile device 104 as determined by a global positioning system (GPS) of the mobile device or a different user-specified location). In certain embodiments, the user may specify a destination location as well. The locations may be specified in any suitable format, such as GPS coordinates, street address, establishment name (e.g., LaGuardia Airport, Central Park, etc.), or other suitable format. At any time (e.g., before the ride, during the ride, or after the ride is complete) the user may specify a method of payment to be used for the ride. The user may also specify whether the request is for immediate pick-up or for a specified time in the future. In various embodiments, the user may specify pick-up by a vehicle that has particular merchandise available for use by the user, such as a specified type of battery or battery charger, bottle of water or other food or beverage, umbrella, or other suitable merchandise. The user may also specify criteria for the driver, such as a minimum performance rating, such that drivers having performance ratings below the minimum performance rating will not be considered during selection of the driver.

The user may use the application to order a ride based on the specified information. The request for the ride is generated based on the information and transmitted to backend system 116. Backend system 116 will facilitate the selection of a driver. In some embodiments, backend system 116 may select a driver based on any suitable factors, such as the information contained in the request from the passenger, the proximity of the driver to the passenger, or other suitable factors. In other embodiments, backend system 116 may select a plurality of drivers that could fulfill the ride request, send information associated with the drivers to the passenger, and allow the passenger to select the driver to be used via the application on the passenger mobile device 104. Any suitable information about the potential driver(s) may be sent to the mobile device 104 either before or after the selection of the driver by the passenger, such as a location of a driver, an estimated pick-up time, a type of car used by a driver, the merchandise available in the car, a driver rating or comments made by other passengers about the driver, or other suitable information.

Once a driver has been selected and has accepted the request to provide a ride, the application may notify the user of the selected driver and provide real-time updates of the driver's location (e.g., with respect to the passenger's location) and estimated pick-up time. The application may also provide contact information for the driver and/or the ability to contact the driver through the application (e.g., via a phone call or text). Once the ride has begun, the application may display any suitable information, such as the current location of the mobile device 104 and the route to be taken. Upon completion of the ride, the application may provide the passenger the ability to rate the driver or provide comments about the driver.

In particular embodiments, a taxi driver application runs on driver mobile devices 108. The application may allow a driver to enter various account information to be utilized by a taxi service. For example, the account information may include a user name and password (or other login credentials), contact information of the driver (e.g., phone number, home address), information used to receive payments from the taxi service (e.g., bank account information), vehicle information (e.g., what model or color of car the driver utilizes), merchandise offered by the driver, or other suitable information.

In various embodiments, the application may allow a driver to specify his availability to transport passengers for the taxi service. The application may periodically transmit the current location of the mobile device 108 as determined by a GPS of the mobile device 108 to the backend system 116. When a driver is selected to provide a ride, backend system 116 may send a notification to the taxi driver application. In some embodiments, the driver may have a limited amount of time to select whether the driver accepts the ride. In other embodiments, the application may be configured by the driver to automatically accept the ride or to automatically accept the ride if certain criteria are met (e.g., fare minimum, direction of travel, minimum passenger rating, etc.).

Once a pairing of the driver and the passenger is confirmed, the application may navigate the driver to the passenger. The application may also provide contact information for the passenger and/or the ability to contact the passenger through the application (e.g., via a phone call or text). The application may also navigate the driver to the passenger's destination once the ride begins. Upon completion of the ride, the application may provide the driver the ability to rate the passenger or provide comments about the passenger.

System 100 may include one or more application servers 112 coupled to the mobile devices through one or more networks 120. The taxi passenger application and taxi driver application may be supported with, downloaded from, served by, or otherwise provided through an application server 112 or other suitable means. In some instances, the applications can be downloaded from an application storefront onto a particular mobile device using storefronts such as Google Android Market, Apple App Store, Palm Software Store and App Catalog, RIM App World, etc., as well as other sources. In various embodiments, the taxi passenger application and taxi driver application may be installed on their respective devices in any suitable manner and at any suitable time. As one example, a taxi passenger application may be installed on a mobile device as part of a suite of applications that are pre-installed prior to provision of the mobile device to a consumer. As another example, a taxi driver application may be installed on a mobile device by a taxi service (or an entity that provisions mobile devices for the taxi service) prior to the issuance of the device to a driver that is employed by or otherwise associated with the taxi service.

As described above, applications utilized by mobile devices 104 and 108 can make use of a backend system 116. Backend system 116 may comprise any suitable servers or other computing devices that facilitate the provision of a taxi service as described herein. For example, backend system 116 may receive a request from a passenger and facilitate the assignment of a driver to fulfill the request. Backend system 116 is described in more detail in connection with FIG. 3.

In general, "servers," and other "computing devices" may include electronic computing devices operable to receive, transmit, process, store, or manage data and information associated with system 100. As used in this document, the term "computing device," is intended to encompass any suitable processing device. For example, portions of system 100 may be implemented using computers other than servers, including server pools or other suitable processing devices. Further, any, all, or some of the computing devices may be adapted to execute any operating system, including Linux, UNIX, Windows Server, etc., as well as virtual machines adapted to virtualize execution of a particular operating system, including customized and proprietary operating systems.

Further, servers and other computing devices of system 100 can each include one or more processors, computer-readable memory, and one or more interfaces, among other features and hardware. Servers can include any suitable software component or module, or computing device(s) capable of hosting and/or serving a software application or services (e.g., services of application server 112 or backend system 116), including distributed, enterprise, or cloud-based software applications, data, and services. For instance, servers can be configured to host, serve, or otherwise manage data sets, or applications interfacing, coordinating with, or dependent on or used by other services, including taxi service applications and software tools. In some instances, a server, system, subsystem, or computing device can be implemented as some combination of devices that can be hosted on a common computing system, server, server pool, or cloud computing environment and share computing resources, including shared memory, processors, and interfaces.

In various embodiments, backend system 116 or any components thereof may be deployed using a cloud service such as Amazon Web Services, Microsoft Azure, or Google Cloud Platform. For example, the functionality of the backend system 116 may be provided by virtual machine servers that are deployed for the purpose of providing such functionality or may be provided by a service that runs on an existing platform.

System 100 also includes various networks 120 used to communicate data between the mobile devices 104 and 108, the backend system 116, and the application server 112. The networks 120 described herein may be any suitable network or combination of one or more networks operating using one or more suitable networking protocols. A network may represent a series of points, nodes, or network elements and interconnected communication paths for receiving and transmitting packets of information. For example, a network may include one or more routers, switches, firewalls, security appliances, antivirus servers, or other useful network elements. A network may provide a communicative interface between sources and/or hosts, and may comprise any public or private network, such as a local area network (LAN), wireless local area network (WLAN), metropolitan area network (MAN), Intranet, Extranet, Internet, wide area network (WAN), virtual private network (VPN), cellular network (implementing GSM, CDMA, 3G, 4G, LTE, etc.), or any other appropriate architecture or system that facilitates communications in a network environment depending on the network topology. A network can comprise any number of hardware or software elements coupled to (and in communication with) each other through a communications medium. In some embodiments, a network may simply comprise a transmission medium such as a cable (e.g., an Ethernet cable), air, or other transmission medium.

Figure 2:
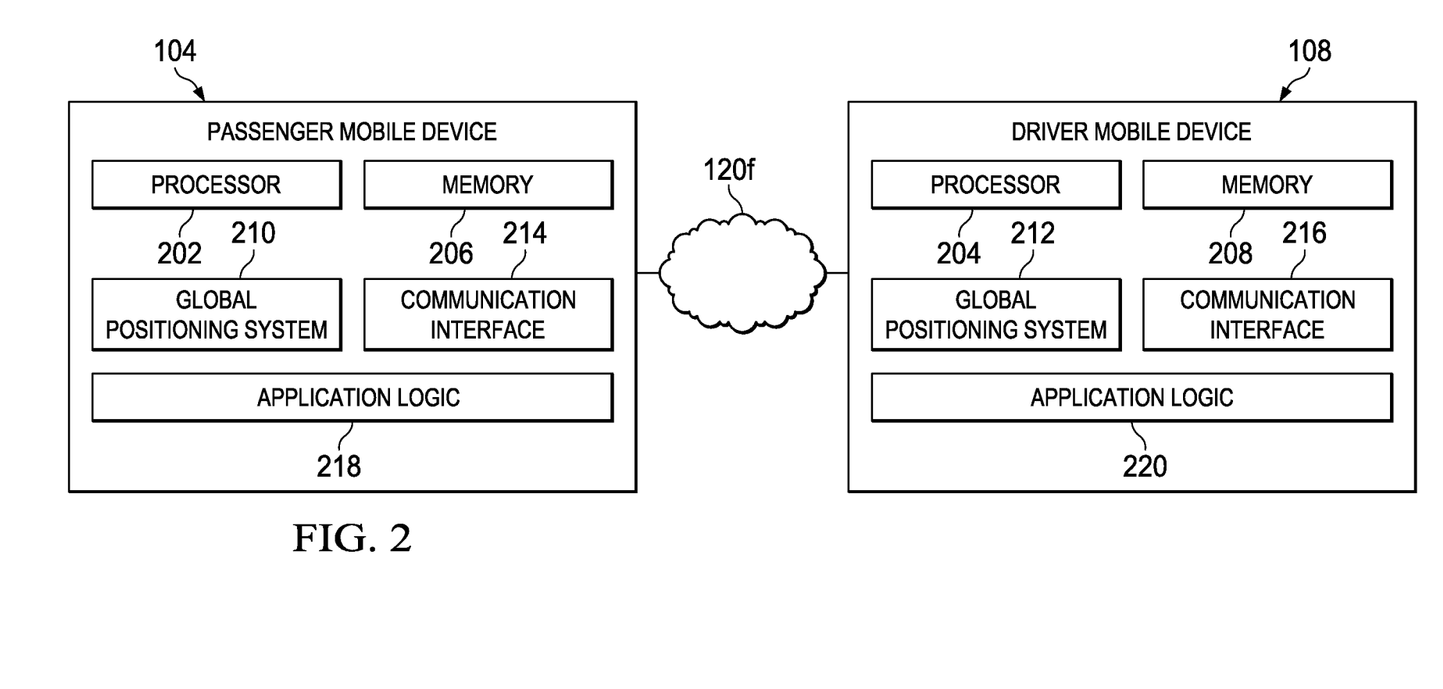
FIG. 2 illustrates a block diagram of a passenger mobile device and a driver mobile device of the system of FIG. 1 in accordance with certain embodiments.

FIG. 2 illustrates a block diagram of a passenger mobile device 104 and a driver mobile device 108 of the system of FIG. 1 in accordance with certain embodiments. In the embodiment shown, the devices may be communicatively coupled through network 120f which may include any suitable intermediary nodes, such as a backend system 116.

In the embodiment depicted, mobile devices 104 and 108 each include a computer system to facilitate performance of their respective operations. In particular embodiments, a computer system may include a processor, storage, and one or more communication interfaces, among other components. As an example, mobile devices 104 and 108 each include one or more processors 202 and 204, memory elements 206 and 208, and communication interfaces 214 and 216, among other hardware and software. These components may work together in order to provide functionality described herein.

Processors 202 and 204 may be a microprocessor, controller, or any other suitable computing device, resource, or combination of hardware, stored software and/or encoded logic operable to provide, either alone or in conjunction with other components of mobile devices 104 and 108, the functionality of these mobile devices. In particular embodiments, mobile devices 104 and 108 may utilize multiple processors to perform the functions described herein. In various embodiments, a processor may include multiple discrete processors communicatively coupled together.

A processor can execute any type of instructions to achieve the operations detailed in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

Memory 206 and 208 may comprise any form of non-volatile or volatile memory including, without limitation, random access memory (RAM), read-only memory (ROM), magnetic media (e.g., one or more disk or tape drives), optical media, solid state memory (e.g., flash memory), removable media, or any other suitable local or remote memory component or components. Memory 206 and 208 may store any suitable data or information utilized by mobile devices 104 and 108, including software embedded in a computer readable medium, and/or encoded logic incorporated in hardware or otherwise stored (e.g., firmware). Memory 206 and 208 may also store the results and/or intermediate results of the various calculations and determinations performed by processors 202 and 204.

Communication interfaces 214 and 216 may be used for the communication of signaling and/or data between mobile devices 104 and 108 and one or more networks (e.g., 120f) and/or network nodes (e.g., backend system 116 and application server 112) coupled to a network or other communication channel. For example, communication interfaces 214 and 216 may be used to send and receive network traffic such as data packets. Each communication interface 214 and 216 may send and receive data and/or signals according to a distinct standard such as an LTE, IEEE 802.11, IEEE 802.3, or other suitable standard. Communication interfaces 214 and 216 may include antennae and other hardware for transmitting and receiving radio signals to and from other devices in connection with a wireless communication session over one or more networks 120.

GPS units 210 and 212 may include any suitable hardware and/or software for detecting a location of their respective mobile devices 104 and 108. For example, a GPS unit may comprise a system that receives information from GPS satellites, wireless or cellular base stations, and/or other suitable source and calculates a location based on this information (or receives a calculated position from a remote source). In one embodiment, the GPS unit is embodied in a GPS chip.

Application logic 218 may include logic providing, at least in part, the functionality of the taxi passenger application described herein. Similarly, application logic 220 may include logic providing, at least in part, the functionality of the taxi driver application described herein. In a particular embodiment, the logic of devices 104 and 108 may include software that is executed by processor 202 and 204. However, "logic" as used herein, may include but not be limited to hardware, firmware, software and/or combinations of each to perform a function(s) or an action(s), and/or to cause a function or action from another logic, method, and/or system. In various embodiments, logic may include a software controlled microprocessor, discrete logic (e.g., an application specific integrated circuit (ASIC)), a programmed logic device (e.g., a field programmable gate array (FPGA)), a memory device containing instructions, combinations of logic devices, or the like. Logic may include one or more gates, combinations of gates, or other circuit components. Logic may also be fully embodied as software.

In various embodiments of the present disclosure, in addition to any combination of the features described above with respect to the taxi passenger application, application logic 218 may provide additional features for the taxi passenger application to enhance a passenger's experience. In a particular embodiment, a passenger may indicate one or more items of merchandise within the taxi passenger application in association with a request for a ride, such that the taxi service may select a vehicle carrying the indicated item(s) of merchandise to fulfill the passenger's request.

In another embodiment, taxi passenger application may display an indication of one or more items of merchandise available (or indications thereof) in a particular vehicle (e.g., a prospective vehicle for transporting the passenger or the vehicle that is fulfilling the passenger's request) to the passenger. In particular embodiments, the taxi passenger application may also display terms associated with the merchandise (e.g., a length of a borrowing period, a price associated with the merchandise, etc.). In some embodiments, the passenger may select merchandise and/or accept offers of merchandise via the taxi passenger application, and in response the merchandise may be dispensed to the passenger during or after the ride (in other embodiments, the driver passenger application could be used to indicate to the taxi service that particular merchandise has been dispensed to a user).

After the passenger has taken possession of the merchandise, the taxi passenger application may provide information associated with the merchandise. For example, the taxi passenger application may display a time and/or date when the passenger accepted the merchandise, a time and/or date when the merchandise is due, an amount per day, week, or other interval that will be charged when the merchandise is not returned by the due date, a maximum amount that will be charged for the item, indications of one or more locations or vehicles to which the merchandise may be returned, or other suitable information. In some embodiments, the taxi passenger application may provide reminders to return the merchandise at one or more suitable intervals (such as a day before the merchandise is due or every day after the merchandise is due) when the app is opened or via push notifications to the device on which the application is installed.

In various embodiments of the present disclosure, in addition to any combination of the features described above with respect to the taxi driver application, application logic 220 may provide additional features for the taxi driver application to enhance the service a driver may provide to a passenger. In an embodiment, the driver application logic may receive an indication that an item of merchandise has been given to a passenger. As an example, a driver may enter information through an interface implemented by the driver application logic indicating that an item of merchandise has been checked out to a passenger. As another example, the driver application logic may sense that an item of merchandise has been received by a passenger (e.g., the logic may sense that a locater device, such as a radio frequency identification tag, collocated with the item of merchandise has left the vehicle at the end of a ride).

The taxi driver application logic may allow the driver to request inventory. For example, the application logic 220 may send a request for the inventory to backend system 116. In various embodiments, the driver may initiate the sending of the request through application logic 220 or the application logic 220 may send the request when it detects that inventory of a particular type of merchandise in the vehicle of the driver is depleted or running low (e.g., below a predetermined threshold). The backend system 116 may facilitate the restocking of the requested inventory. As various examples, backend system 116 may notify the driver of a nearby location at which the driver may pick up additional inventory, may notify the driver of the location of another driver associated with a vehicle carrying merchandise that may be transferred to the vehicle running low on inventory, or may initiate the shipping of additional merchandise items to a location (e.g., home) associated with the driver.

The taxi driver application logic may also allow the driver to check in merchandise items from a passenger. For example, when a passenger requests a ride from a driver, the passenger may return to the driver an item of merchandise that was borrowed during a previous trip fulfilled by a driver of the taxi service. When an item is checked in or additional items are picked up, the taxi driver application may allow the driver to update a record of the amount of inventory.

The application logic 220 may communicate any suitable information to the backend system 116. For example, application logic 220 may communicate driver requests for inventory, check-outs of inventory, check-ins of inventory, transfers of inventory to other drivers, reception of inventory, or other suitable information.

Figure 3:
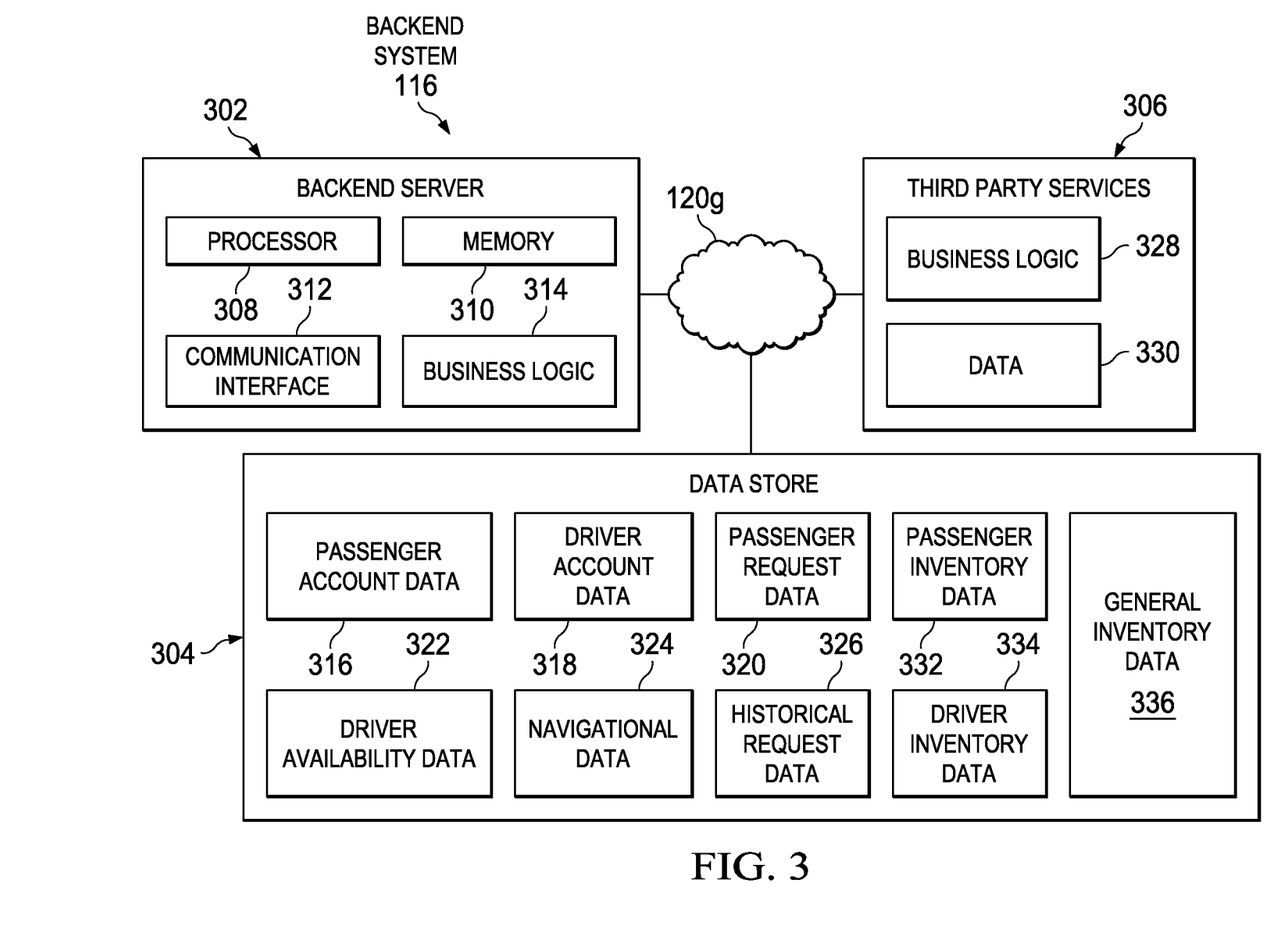
FIG. 3 illustrates a block diagram of a backend system of the system of FIG. 1 in accordance with certain embodiments.

FIG. 3 illustrates a block diagram of a backend system 116 of the system of FIG. 1 in accordance with certain embodiments. Although FIG. 3 depicts a particular implementation of the backend system 116, the backend system may include any suitable devices to facilitate the operation of the taxi service described herein. In the embodiment depicted, backend system includes backend server 302, data store 304, and third party services 306 coupled together by network 120g. In various embodiments, backend server 302, data store 304, and/or third party services 306 may each comprise one or more physical devices (e.g., servers or other computing devices) providing the functionality described herein. In some embodiments, one or more of backend server 302, data store 304, and third party services 306 (or portions thereof) are deployed using a cloud service and may comprise one or more virtual machines or containers.

In the embodiment depicted, backend server 302 include a computer system to facilitate performance of its operations. As an example, backend server 302 includes one or more processors 308, memory elements 310, and communication interfaces 312, among other hardware and software.

These components may work together in order to provide backend server functionality described herein. Processor 308 may have any suitable characteristics of the processors 202 and 204 described above. In particular embodiments, backend server 302 may utilize multiple processors to perform the functions described herein. In various embodiments, a processor may include multiple discrete processors communicatively coupled together.

Similarly, memory 310 may have any suitable characteristics of memories 206 and 208 described above. Memory 310 may store any suitable data or information utilized by backend server 302, including software embedded in a computer readable medium, and/or encoded logic incorporated in hardware or otherwise stored (e.g., firmware). Memory 310 may also store the results and/or intermediate results of the various calculations and determinations performed by processor 308.

Communication interface 312 may also have any suitable characteristics of communication interfaces 214 and 216 described above. Communication interfaces 312 may be used for the communication of signaling and/or data between backend server 302 and one or more networks (e.g., networks 120) and/or network nodes (e.g., mobile devices 104 and 108, data store 304, third party services 306, and application server 112) coupled to a network or other communication channel.

Business logic 314 may have any suitable characteristics of application logic 218 and 220 described above. Business logic 314 may include logic providing, at least in part, the functionality of the backend server described herein. In a particular embodiment, business logic 314 may include software that is executed by processor 308. However, in other embodiments, business logic 314 may take other forms such as those described above with respect to application logic 218 and 220.

Backend server 302 may communicate with data store 304 to initiate storage and retrieval of data related to the taxi service. Data store 304, may store any suitable data associated with the taxi service in any suitable format(s). For example, data store 304 may include one or more database management systems (DBMS), such as SQL Server, Oracle, Sybase, IBM DB2, or NoSQL data bases (e.g., Redis and MongoDB).

In the embodiment depicted, data store 304 includes passenger account data 316, driver account data 318, passenger request data 320, driver availability data 322, navigational data 324, historical request data 326, passenger inventory data 332, driver inventory data 334, and general inventory data 336. The various data may be updated at any suitable intervals.

Passenger account data 316 may include any suitable information associated with passenger accounts, such as contact information (e.g., real names and addresses), user names and passwords (or other authentication information), payment information (e.g., credit card or bank account numbers and associated information), passenger preferences (e.g., preferred type or color of car), ratings the passenger has given drivers, ratings the passenger has received from drivers, or other information associated with passenger profiles.

Driver account data 318 may include any suitable information associated with driver accounts, such as contact information (e.g., real names and addresses), user names and passwords (or other authentication information), payment collection information (e.g., bank account information), vehicle information (e.g., models and colors of cars the drivers utilize, maximum capacity of the cars of the drivers), merchandise offered by the drivers, whether the drivers are available to transport passengers, whether the drivers have opted for automatic acceptance of passenger requests (whereby the backend server 302 may assign a passenger request to the driver without waiting for the driver to indicate acceptance of a request), or other suitable information.

Passenger request data 320 may comprise pending requests (i.e., requests that have not yet been fulfilled) received from passengers. Each request may include any suitable information, such as any combination of one or more of an identification of the passenger making the request, the time the request was made, the current location of the passenger, the desired pick-up location, the desired pick-up time, the estimated time remaining until a driver can pick up the passenger, the actual pick-up time, the desired destination location of the passenger (which the passenger may or may not provide at the time the request is made), the type of vehicle requested, estimated fare for the trip, current accumulated fare for the trip, estimated time and mileage remaining in the trip, other information specified by the user (e.g., requested merchandise, requested minimum rating of driver), whether a driver has been assigned to a request, and which driver has been assigned to a request.

Driver availability data 322 may comprise information associated with drivers that are available to transport passengers. In some embodiments, driver availability data 322 may also comprise information associated with drivers that are not available to transport passengers (e.g., because they are off-duty or currently transporting a passenger). An entry in the driver availability data 322 may include an identification of a driver and any suitable associated information, such as one or more of a current location of the driver, whether the driver is available to transport passengers, whether the driver is currently transporting a passenger, a destination location of a current trip of the driver, an estimate of how long it will be before the driver finishes his current trip, whether the driver has opted for automatic acceptance of passenger requests, or other suitable information.

Navigational data 324 may comprise information supporting navigation functions provided by the taxi passenger applications and driver passenger applications. For example, navigational data 324 may comprise map data that may be sent to passenger mobile devices 104 and driver mobile devices 108 to allow the devices to display maps and associated indicators (e.g., location of passenger(s), location of driver(s), desired routes, etc.) In some embodiments, the navigational data may also comprise information indicative of the amount of time required to travel between various locations. In some embodiments, navigational data 324 may comprise historic and/or real time data about the flow of traffic in particular areas enabling backend server 302 to calculate an estimated time required to travel from one location to another.

Historical request data 326 may comprise information about completed requests. In some embodiments, historical request data 326 may also include information about canceled requests. The information for each request may include any combination of the information listed above with respect to requests stored in the passenger request data 320 as well as any combination of additional data such as the time at which the destination location was reached, the total time of the trip, the total fare, a rating given by the passenger to the driver or by the driver to the passenger for the trip, or other suitable information associated with the trip.

Passenger inventory data 332 may include information associated with passengers of the taxi service and inventory items associated with those passengers. Passenger inventory data 332 may include an entry for each passenger of any suitable number of passengers. Any suitable information may be included in an entry for a passenger, such as merchandise currently borrowed by the passenger, when the merchandise was borrowed, which driver the merchandise was borrowed from, where the merchandise was borrowed (e.g., a physical location), when the merchandise is due, late fees associated with the merchandise (e.g., a daily or weekly late fee and/or a maximum late fee). The merchandise in possession of the passenger may be identified in any suitable manner. For example, each item of merchandise could be tagged with a serial number or other identifier and this identifier may be stored in the entry of the passenger that has possession of the item. As another example, the entry for a passenger may merely identify a type of item (e.g., umbrella) in possession by the passenger (as opposed to an identifier for the specific item).

An entry for a passenger may also include historical records for past merchandise transactions by the passenger including any of the information listed above and additional information such as when the item was returned, where the item was returned to, which driver the passenger returned the item to, late fees incurred, or other suitable information. In various embodiments, an entry for a passenger may also include one or more indications of the suitability of the passenger to borrow merchandise. For example, the indications may include metrics on how often the passenger requests rides from the taxi service, an average cost for the passenger's rides with the taxi service, whether a passenger is a premium member of the taxi service (e.g., in one embodiment, a premium membership may be offered by the taxi service where one of the benefits of the premium membership is access to merchandise), a relative ranking with respect to other passengers of how desirable a customer the passenger is (which could be based on information stored in passenger inventory data 332 or any other information in data store 304) or other suitable information.

Driver inventory data 334 may include information associated with drivers of the taxi service and inventory items associated with those drivers. In particular embodiments, driver inventory data 334 may include an entry for each driver. In some embodiments, an entry may include indications of quantities of different types of merchandise in possession of the driver. An entry could also include identification information for each item of merchandise held by the driver. For example, each item of merchandise could be tagged with a serial number or other identifier and this identifier may be stored in the entry of the driver that has possession of the item. Driver inventory data 334 might also include status information describing a condition of one or more of the items of merchandise. For example, for a battery, the status information may describe a charge state of the battery. For damaged items, the status information might include a description of the damage so that the taxi service may track damage incurred by each passenger.

General inventory data 336 may include any suitable information facilitating the provision of merchandise inventory to drivers associated with the taxi service. For example, general inventory data 336 may include information identifying any number of locations that may dispense inventory to drivers as well as quantities of merchandise available at such locations.

In various embodiments, backend server 302 may access third party services 306 through business logic 328 to access data 330. Third party services 306 may represent any suitable number of devices operated by any suitable number of third parties that are distinct from an entity that operates the backend system 116 and/or data store 304. For example, in some embodiments the navigational data may be obtained from a third party service 306 rather than data store 304, or additional third party navigational data such as map data or historical and/or current traffic flow information may be used to supplement navigational data 324. As another example, third party services 306 may authenticate users on behalf of the backend server 302 (e.g., through an account of the user with the third party). Business logic 328 may comprise any suitable logic operable to receive requests for data from backend system 116 and/or mobile devices 104 and 108 and provide responses to the requests.

Backend server 302 may be in communication with each passenger mobile device 104 and each driver mobile device 108 that is utilizing the taxi service at a particular time. Backend server may store information received from the mobile devices 104 and 108 in data store 304. Backend server 302 may also receive and respond to requests made by mobile devices 104 and 108 by processing information retrieved from data store 304.

When a passenger opens the taxi passenger application, the backend server 302 may log the passenger in based on a comparison of authentication information provided by the passenger mobile device 104 with authentication information stored in passenger account data 316. The passenger may then request a ride. The request is received by the backend server 302 and stored in passenger request data 320. Backend server 302 may access driver availability data 322 to determine one or more drivers that would be suitable to fulfill the request from the passenger. In one embodiment, backend server 302 selects a particular driver (e.g., based on the driver's locality with respect to the passenger's pick-up location) and sends information associated with the request to the driver. The driver indicates whether he accepts or rejects the request via his mobile device 108. If the driver rejects the request, backend server 302 selects a different driver and the process is repeated until the backend server 302 receives an accepted request from a driver. In another embodiment, backend server 302 may select a plurality of drivers that may fulfill a passenger's request and allow the passenger to select one of the drivers. The backend server 302 may proceed to notify the driver of the request in a similar manner to that described above. In yet another embodiment, backend server 302 may select a plurality of drivers that may fulfill a passenger's request and notify each driver of the passenger's request. The backend server 302 may then allocate the request to one of the drivers based on any suitable criteria. For example, the driver who is the first to accept the request may be assigned to the request. As another example, if multiple drivers accept the request within a given timeframe, the request may be assigned to the most suitable driver (e.g., the driver that is closest to the pick-up location or a driver that has a car that meets preferred characteristics of the passenger's request).

Once the request has been accepted by a driver, the backend server 302 notifies the passenger that a driver has accepted his request and provides any suitable information associated with the driver (e.g., driver's current location, model and color of vehicle, estimated time of arrival, etc.) to the passenger.

The backend server 302 may provide navigation information to the driver mobile device 108 to direct the driver to the passenger's pickup location and subsequently to direct the driver to the passenger's destination location. The backend server 302 may also provide real-time updates associated with the trip to both the passenger and the driver.

Once the passenger's destination location has been reached, the backend server 302 may facilitate payment of the fare for the trip using payment information stored in passenger account data 316 and/or driver account data 318 (or information supplied by the passenger at the time of the transaction). The backend server 302 may also receive ratings associated with the trip for the passenger and driver and store these ratings in data store 304.

Backend server 302 may, in conjunction with data store 304, track and manage the distribution of merchandise inventory held by drivers and passengers associated with the taxi service. Any suitable merchandise may be dispensed among drivers and passengers. Nonlimiting examples of merchandise include a mobile telephone, rechargeable batteries for mobile telephones or other computing devices, portable power banks, battery chargers including power cables (e.g., with Universal Serial Bus, Lightning, or other connectors), umbrellas, raincoats, and other portable items.

Backend server 302 may communicate with mobile devices of drivers or other sources to track the inventory possessed by drivers and to facilitate inventory restocking. For example, backend server 302 may receive notifications from a driver mobile device when the driver has added merchandise to the driver's inventory or dispensed merchandise to a passenger or other driver and may update data store 304 accordingly. Backend server 302 may also detect that particular merchandise has run out or is getting low and may notify the driver mobile device of such. In some embodiments, when backend server 302 detects depletion of a particular item (or combination of items), it may provide the driver with information on the location of the nearest distribution center or another driver that has the needed merchandise. In a particular embodiment, backend server 302 may also track the usability of items in possession of the driver and may factor the usability of the items into whether the driver is in need of additional items. For example, if one or more batteries in possession of the driver is in a low charge state, the backend server 302 may instruct the driver to obtain more batteries or may notify the driver to charge the batteries. In some embodiments, backend server 302 may direct the driver to another driver or a distribution center from which the driver may pick up additional inventory items to restock his supply. In various embodiments, drivers may drop off inventory items at the distribution center (e.g., batteries needing charging or items needing repair). In some embodiments, when a driver picks up merchandise from another driver, backend server 302 may communicate with both drivers to efficiently guide them to a meeting spot where the exchange can take place. In one embodiment, backend server 302 may notify drivers when they are close to a distribution center (e.g., when they are located within a predetermined distance or driving time from the distribution center).

Backend server 302 may facilitate the offering of inventory to passengers. For example, backend server 302 may prompt a driver through the taxi driver application to verbally offer one or more items of merchandise to a passenger. As another example, backend server 302 may communicate with a taxi passenger application to offer one or more items of merchandise to a passenger (e.g., via a GUI of the taxi passenger application).

In particular embodiments, the merchandise may be offered to a passenger prior to or concurrent with a ride request generated by the passenger. For example, when making a ride request, a passenger may indicate that he would like a vehicle that is able to provide particular merchandise. In such embodiments, backend server 302 may select one or more vehicles that currently has the indicated merchandise and may alert those vehicles of the ride request. Upon acceptance of the ride request by a suitable driver, the vehicle with the merchandise will be routed to the passenger to fulfill the ride request. The backend server 302 may also notify the driver through the taxi driver application that the merchandise has been requested.

In particular embodiments, in response to an acceptance by a driver of a ride request, a detection that a ride has begun, a detection that the destination location of the ride request has been reached, or user input into the taxi passenger application, or other stimulus, the backend server 302 may send the taxi passenger application information associated with the merchandise available in the vehicle fulfilling the ride request. For example, a list of the items available may be sent, along with terms (e.g., price, borrowing periods, late fees, etc.) that apply to the items.

In various embodiments, merchandise may be offered to a passenger (e.g., via the taxi passenger application or by prompting driver through the driver passenger application to offer the merchandise) in response to a detection that the merchandise is likely to be needed. For example, an umbrella may be offered in response to the backend server 302 determining that it is currently raining or will rain in the near future (e.g., via a weather forecast or via sensors associated with the driver's vehicle). As another example, a battery charger, battery pack, or battery may be offered to a passenger in response to a determination that a battery of a mobile device of the passenger is below a predetermined threshold (e.g., in one embodiment, the taxi passenger application may sense the battery level of the passenger's mobile device and initiate the offer or provide the sensed battery level to backend server 302 which may then initiate the offer). As yet another example, a mobile device or component thereof (e.g., a Subscriber Identity Module card) conforming to a particular locale (e.g., the locale of the destination location of the ride) may be offered in response to a determination that the passenger is from a different locale (e.g., from a different country) based on passenger account data 316 or other information source.

In particular embodiments, the taxi service may be selective as to when merchandise is offered to a passenger. For example, in some embodiments, merchandise may only be offered to selected passengers, such as those having a premium subscription to the taxi service, customers that frequently use the taxi service, or new customers on which the taxi service is seeking to make a good impression. The suitability of a passenger may be based on a transaction history of the passenger including any suitable information associated with the passenger, such as how long they have been registered with the taxi service (e.g., preference might be given to relatively new and/or longstanding customers), how many rides they have requested through the taxi service, how often they request rides through the taxi service, an aggregate value of the rides the passenger has requested through the taxi service, an average value of rides the passenger has requested through the taxi service, other suitable factors, or any combination thereof. In various embodiments, the suitability of the passenger may be used to determine whether to offer a particular passenger one or more items. The suitability of the passenger may also be used to set the terms of the offer (e.g., price, the length of the borrowing period, late fees, late fee maximum, etc.) with passengers having higher suitability being offered better terms.

In various embodiments, the amount of inventory in the vehicle associated with the driver may be used in conjunction with the suitability of the passenger to determine whether to offer merchandise to a particular passenger. For example, if the amount of merchandise in the vehicle is relatively low, the taxi service may be relatively more selective about which passengers are offered merchandise as compared to an instance where the amount of merchandise in the vehicle is larger.

After a determination that merchandise should be offered to the passenger is made, the merchandise and the terms associated with the offer are presented to the passenger (e.g., verbally by the driver, through a taxi passenger application, or via other means). The passenger may accept or reject the offer verbally (after which the driver may enter acceptance of the offer through his taxi driver application), via taxi passenger application, or through other means. In various embodiments, the decision may be communicated to backed server 302 which may then update data store 304 if necessary. For example, if the passenger accepts the offer, the backend server 302 may cause an entry for the passenger to be created or updated in passenger inventory data 332. In addition, the backend server 302 may cause an entry associated with the driver in the driver inventory data 334 to be updated to reflect the dispensed merchandise.

If the merchandise was borrowed by the passenger, the passenger may return the merchandise to another driver associated with the taxi service (e.g., in conjunction with a passenger requesting an additional ride from the taxi service) or to another location associated with the taxi service (e.g., a distribution center). The returned merchandise may be scanned in or otherwise entered via a taxi driver application or other logic and reported to backend server 302 which may update the appropriate entries in passenger inventory data 332, driver inventory data 334, and/or general inventory data 336.

In various embodiments, if the item has been returned late, processing of the late fee may be initiated in response to the item being returned. In other embodiments, processing of a late fee may occur at any suitable time, such as periodically (e.g., daily) after an item is due or after a particular amount of time has passed since the due date. In some embodiments, after a passenger borrows an item, they may decide to keep the item and may either pay the maximum late fee penalty or indicate the purchasing of the item via their taxi passenger application. In various embodiments, the backend server 302 may send reminders to the passenger mobile device 104 or other device associated with the passenger (e.g., via a text message or through passenger application logic 218) indicating when the item is due, late fees that will be applicable if the item is not returned on time, where the item may be returned to, or other information associated with the item.

Figure 4:
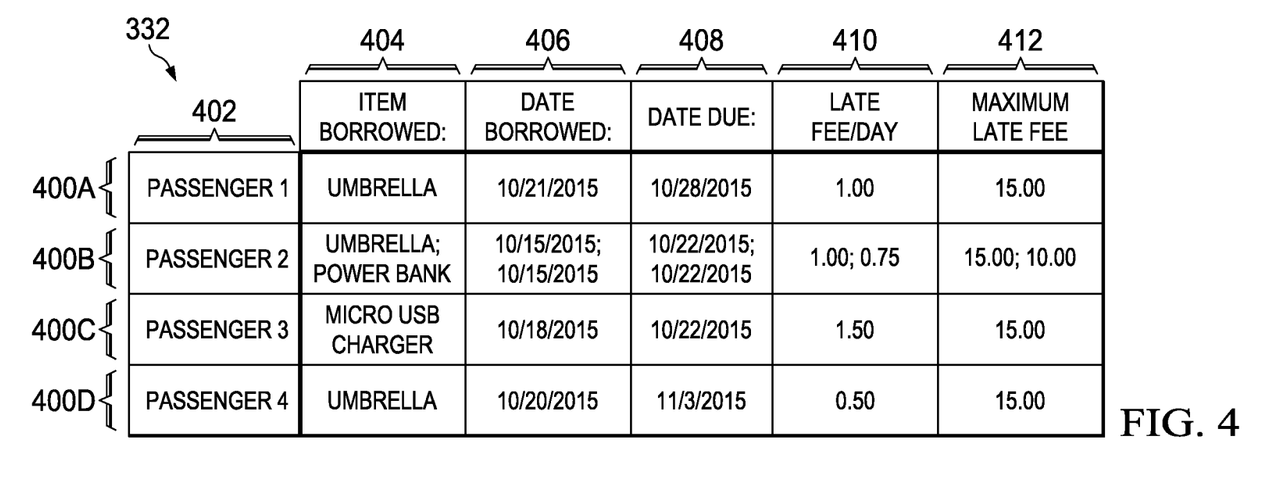
FIG. 4 illustrates passenger inventory data of FIG. 3 in accordance with certain embodiments.

FIG. 4 illustrates example passenger inventory data 332 in accordance with certain embodiments. In the embodiment depicted, passenger inventory data 332 includes an entry 400 for each of four distinct passengers, though passenger inventory data 332 may include any suitable number of entries for each passenger of any suitable number of passengers. Each entry 400 includes a field 402 for identifying a passenger, a field 404 for identifying one or more items that are currently in possession by the passenger, a field 406 for identifying when each item was borrowed by the passenger, a field 408 for identifying when each borrowed item is due, a field 410 for identifying the late fee associated with the borrowed item, and a field 412 for identifying the maximum late fee that is to be charged for the borrowed item. As in the depicted embodiment, the terms for borrowing an item may vary based on the passenger and/or item borrowed. For example, in the embodiment depicted, passenger 4 is provided with better terms (longer borrowing period and a lower late fee rate) for borrowing an umbrella when compared to passenger 1. As described above, the difference in terms may be based on any suitable factors, such as the suitability of the particular passengers.

Figure 5:
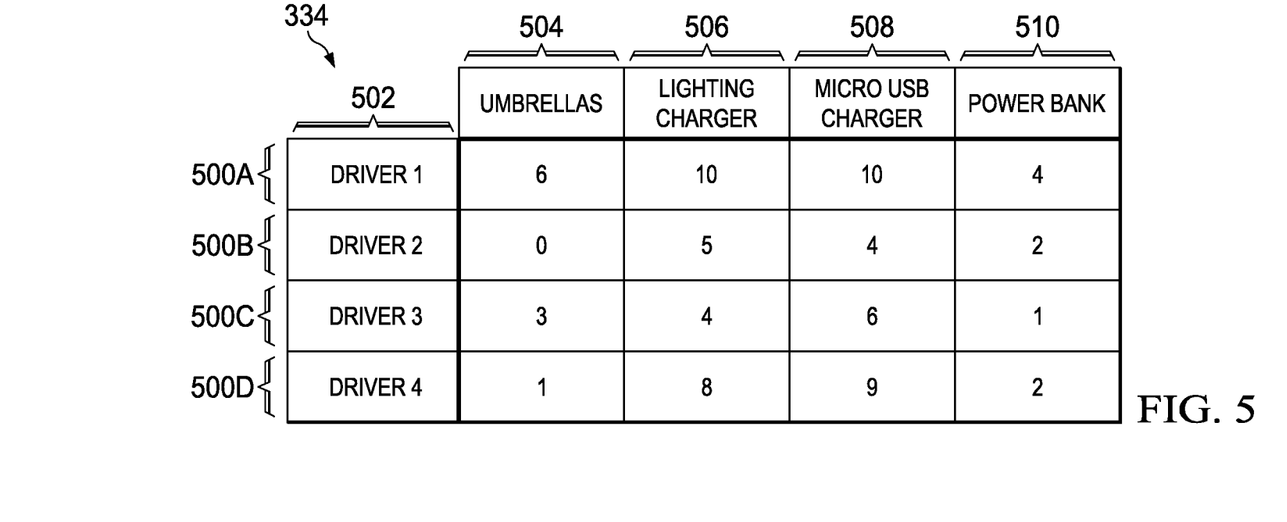
FIG. 5 illustrates driver inventory data of FIG. 3 in accordance with certain embodiments.

FIG. 5 illustrates example driver inventory data 334 in accordance with certain embodiments. In the embodiment depicted, driver inventory data 334 includes an entry 500 for each of four distinct drivers, though driver inventory data 334 may include any suitable number of entries for each driver of any suitable number of drivers. Each entry 500 includes a field 502 for identifying a driver and fields 504-510 for identifying the quantity of items currently in possession by the corresponding driver.

Figure 6:
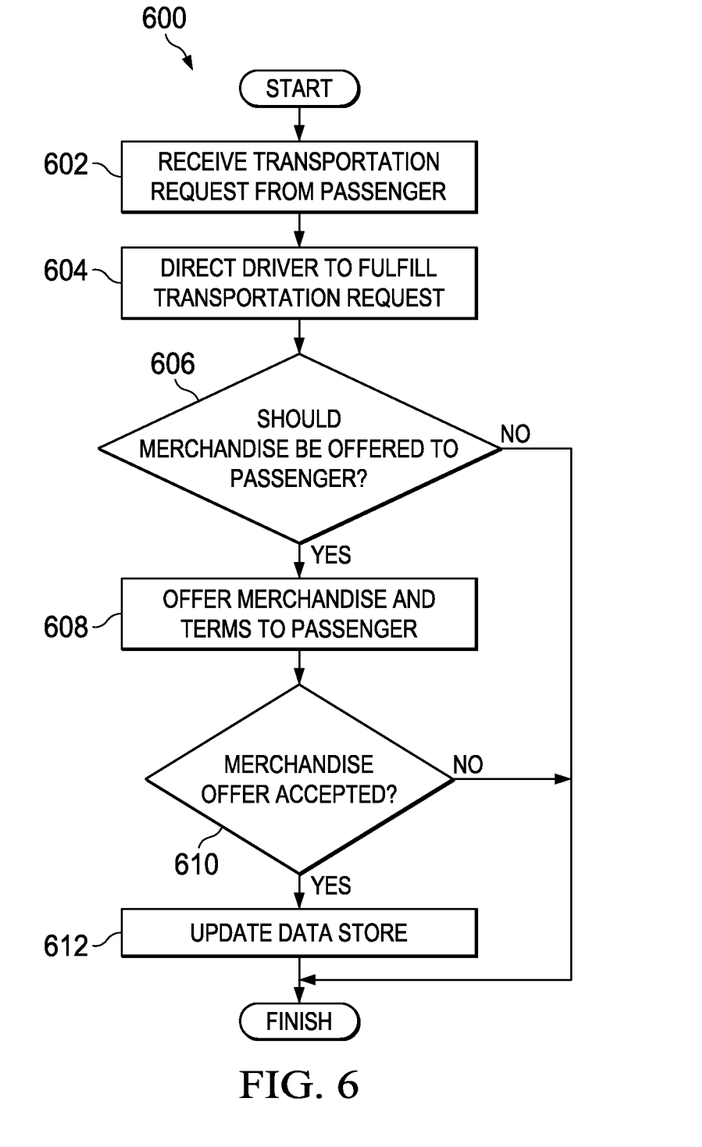
FIG. 6 illustrates a method for distributing merchandise to a passenger of a taxi service in accordance with certain embodiments.

FIG. 6 illustrates a method for distributing an inventory item to a passenger of a taxi service in accordance with certain embodiments. The steps of the method may be performed by any suitable entities (e.g., passenger mobile device 104, driver mobile device 108, or backend server 302) described herein alone or in combination with one or more other entities. At step 602, a transportation request is received from a passenger. At step 604, a driver is directed to fulfill the transportation request. At step 606, it is determined whether a merchandise item should be offered to the passenger. This determination may be made at any suitable time, such as prior to, during, or after the ride is complete. The determination may be made based on any suitable factors, such as whether the passenger has requested merchandise, whether a need for the merchandise is detected, the amount of merchandise in the vehicle, the suitability of the passenger, other factors, or any combination thereof.

If it is determined that an offer should not be made, the method ends. If it is determined that an offer should be made, then the merchandise and related terms are offered to the passenger at step 608. In particular embodiments, the terms of the offer may be based on any suitable factors such as those listed above with respect to the factors used to determine whether the offer is made. In addition, late fees, late fee maximums, or purchase prices may be based on set values for each type of merchandise such as the cost of an item. In various embodiments, these set values may then be adjusted based on any of the factors mentioned above.

At step 610 it is determined whether the merchandise offer has been accepted. If the merchandise offer is not accepted, the method ends. If the merchandise offer is accepted, a data store is updated at 612. For example, the terms of the offer and an indication that the passenger has accepted the offer may be recorded in a data store. As another example, the inventory held by the driver may be updated to reflect the transfer of one or more merchandise items from the driver to the passenger.

Some of the steps illustrated in FIG. 6 may be repeated, combined, modified or deleted where appropriate, and additional steps may also be included. Additionally, steps may be performed in any suitable order or concurrently without departing from the scope of particular embodiments.

It is also important to note that the steps in FIG. 6 illustrate only some of the possible scenarios that may be executed by, or within, the various components of the system described herein. Some of these steps may be deleted or removed where appropriate, or these steps may be modified or changed considerably without departing from the scope of the present disclosure. In addition, a number of these operations may have been described as being executed concurrently with, or in parallel to, one or more additional operations. However, the timing of these operations may be altered considerably. The preceding operational flows have been offered for purposes of example and discussion.

The functionality described herein may also be performed by any suitable component of the system. For example, certain functionality described herein as being performed by backend server 116, may, in various embodiments, be performed by any combination of one or more passenger mobile devices 104 or driver mobile devices 108 where appropriate. Similarly, certain functionality described herein as being performed by a passenger mobile device 104 or a driver mobile device 108 may, in various embodiments, be performed by backend server 116 where appropriate.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:

receiving, by at least one processing device of one or more server devices associated with a taxi service from a passenger computing device associated with a passenger, a transportation request comprising a pickup location and a destination location;

transmitting, by the at least one processing device based on the transportation request to a driver computing device associated with a driver, navigational data to direct the driver to the pickup location to transport the passenger to the destination location;

receiving, by the at least one processing device from the passenger computing device, data comprising battery level data and user data associated with the passenger computing device;

responsive to the data comprising the battery level data, determining, by the at least one processing device and based on the battery level data, that a battery level of the passenger computing device is below a threshold battery level;

determining, by the at least one processing device of the one or more server devices and based on the battery level of the passenger computing device being below the threshold battery level, to initiate a first offer for a mobile device battery or a mobile device charger to be used temporarily with the passenger computing device;

determining, by the at least one processing device of the one or more server devices and based on the user data, to initiate a second offer of a mobile device or a Subscriber Identity Module (SIM) card to be used temporarily with the passenger computing device;

based on initiating the first offer and the second offer, sending, by the at least one processing device of the one or more server devices and to the driver computing device, instructions to dispense: the mobile device battery or the mobile device charger, and the mobile device or the SIM card to the passenger, and receiving, by the at least one processing device and from the driver computing device, a notification that the driver has dispensed: the mobile device battery or the mobile device charger, and the mobile device or the SIM card to the passenger.

2. The method of claim 1, wherein:

determining to initiate the first offer further comprises determining, based on driver inventory data, that the mobile device battery or the mobile device charger are located in a vehicle associated with the driver computing device; and determining to initiate the second offer comprises determining, based on the driver inventory data, that the mobile device or the SIM card are located in the vehicle associated with the driver computing device.

3. The method of claim 1, wherein determining to initiate the first offer and determining to initiate the second offer further comprise analyzing a transaction history of the passenger with the taxi service.

4. The method of claim 1, further comprising determining a length of time that the passenger may keep the mobile device battery or the mobile device charger and the mobile device or the SIM card.

5. The method of claim 1, further comprising, in response to receiving the notification that the driver has dispensed: the mobile device battery or the mobile device charger, and the mobile device or the SIM card to the passenger, sending, by the at least one processing device, an update to a data store, the update indicating that the passenger is in possession of: the mobile device battery or the mobile device charger, and the mobile device or the SIM card, wherein the data store tracks a corresponding quantity of items of merchandise located in each vehicle of a plurality of vehicles associated with the taxi service.

6. The method of claim 1, wherein:

the mobile device battery or the mobile device charger, and the mobile device or the SIM card are to be dispensed to the passenger for use at least during fulfillment of the transportation request in a vehicle associated with the driver computing device.

7. The method of claim 1, further comprising determining not to dispense: the mobile device battery or the mobile device charger, and the mobile device or the SIM card to a second passenger based on a transaction history of the second passenger with the taxi service.

8. The method of claim 5, further comprising:

receiving, by the at least one processing device and from a second driver computing device, a notification that a second driver associated with the second driver computing device has received the dispensed: mobile device battery or the mobile device charger, and the mobile device or the SIM card; and updating, by the at least one processing device, the data store by indicating that the second driver is in possession of: the mobile device battery or the mobile device charger, and the mobile device or the SIM card.

9. The method of claim 2, further comprising updating, based on receiving the notification, the driver inventory data to reflect the dispensed: mobile device battery or the mobile device charger, and the mobile device or the SIM card.

10. The method of claim 2, wherein the transportation request received from the passenger computing device associated with the passenger comprises a request for: the mobile device battery or the mobile device charger, and the mobile device or the SIM card.

11. A system comprising:
at least one processor; and
a non-transitory computer-readable medium comprising instructions that, when executed by the at least one processor, cause the system to:
receive, from a passenger computing device associated with a passenger, a transportation request comprising a pickup location and a destination location;
transmit, based on the transportation request and to a driver computing device associated with a driver, navigational data to direct the driver to the pickup location to transport the passenger to the destination location;
receive, from the passenger computing device, data comprising battery level data and user data associated with the passenger computing device;
responsive to the data comprising the battery level data, determine, based on the battery level data, that a battery level of the passenger computing device is below a threshold battery level;
determine, based on the battery level of the passenger computing device being below the threshold battery level, to initiate a first offer for a mobile device battery or a mobile device charger to be used temporarily with the passenger computing device;
determine, based on the user data, to initiate a second offer of a mobile device or a Subscriber Identity Module (SIM) card to be used temporarily with the passenger computing device;
based on initiating the first offer and the second offer, send, to the driver computing device, instructions to dispense: the mobile device battery or the mobile device charger, and the mobile device or the SIM card to the passenger; and
receive, from the driver computing device, a notification that the driver has dispensed: the mobile device battery or the mobile device charger, and the mobile device or the SIM card to the passenger.

12. The system of claim 11,
further comprising instructions that, when executed by the at least one processor, cause the system to:
determine to initiate the first offer by determining, based on driver inventory data, that the mobile device battery or the mobile device charger are located in a vehicle associated with the driver computing device, and
determine to initiate the second offer by determining, based on the driver inventory data, that the mobile device or the SIM card are located in the vehicle associated with the driver computing device.

13. The system of claim 11, further comprising instructions that, when executed by the at least one processor, cause the system to determine to initiate the first offer and determine to initiate the second offer by analyzing a transaction history of the passenger.

14. The system of claim 12, further comprising instructions that, when executed by the at least one processor, cause the system to:
receive, from the driver computing device, a request indicating that the number of at least one of mobile device batteries, mobile device chargers, mobile devices, or SIM cards in the vehicle associated with the driver computing device falls below a predetermined threshold; and
send, to the driver computing device, a notification indicating a nearby location where the driver associated with the driver computing device may access additional inventory.

15. The system of claim 11, further comprising instructions that, when executed by the at least one processor, cause the system to:
in response to receiving the notification that the driver has dispensed: the mobile device battery or the mobile device charger, and the mobile device or the SIM card to the passenger, send an update to a data store, the update indicating that the passenger is in possession of: the mobile device battery or the mobile device charger, and the mobile device or the SIM card;
receive, from a second driver computing device, a notification that the passenger has returned: the mobile device battery or the mobile device charger, and the mobile device or the SIM card to a second driver associated with the second driver computing device; and
update the data store to indicate that the passenger has returned: the mobile device battery or the mobile device charger, and the mobile device or the SIM card.

16. A computer-readable non-transitory medium comprising instructions that, when executed by at least one processing device, cause a computing device to:
receive, from a passenger computing device associated with a passenger, a transportation request comprising a pickup location and a destination location;
transmit, based on the transportation request to a driver computing device associated with a driver, navigational data to direct the driver to the pickup location to transport the passenger to the destination location;
receive, from the passenger computing device, data comprising battery level data and user data associated with the passenger computing device;
responsive to the data comprising the battery level data, determine, based on the battery level data, that a battery level of the passenger computing device is below a threshold battery level;
determine, based on the battery level of the passenger computing device being below the threshold battery level, to initiate a first offer for a mobile device battery or a mobile device charger to be used temporarily with the passenger computing device;
determine, based on the user data, to initiate a second offer of a mobile device or a Subscriber Identity Module (SIM) card to be used temporarily with the passenger computing device;
based on initiating the first offer and the second offer, send, to the driver computing device, instructions to dispense: the mobile device battery or the mobile device charger, and the mobile device or the SIM card to the passenger; and
receive, from the driver computing device, a notification that the driver has dispensed: the mobile device battery or the mobile device charger and the mobile device or the SIM card to the passenger.

17. The computer-readable non-transitory medium of claim 16, further comprising instructions that, when executed by the at least one processing device, cause the computing device to:
determine to initiate the first offer by determining, based on driver inventory data, that the mobile device battery or the mobile device charger are located in a vehicle associated with the driver computing device; and
determine to initiate the second offer by determining, based on the driver inventory data, that the mobile device or the SIM card are located in the vehicle associated with the driver computing device.

18. The computer-readable non-transitory medium of claim 17, further comprising instructions that, when executed by the at least one processing device, cause the computing device to initiate the first offer and determine to initiate the second offer by analyzing a transaction history of the passenger.

19. The computer-readable non-transitory medium of claim 16, further comprising instructions that, when executed by the at least one processing device, cause the computing device to:
- receive, from the driver computing device, a request indicating that the number of at least one of mobile device batteries, mobile device chargers, mobile device, or SIM cards in the vehicle associated with the driver falls below a predetermined threshold; and
- send, to the driver computing device, a notification indicating a nearby location where the driver associated with the driver computing device may access additional inventory.

20. The computer-readable non-transitory medium of claim 17, further comprising instructions that, when executed by the at least one processing device, cause the computing device to:
- in response to receiving the notification that the driver has dispensed: the mobile device battery or the mobile device charger, and the mobile device or the SIM card to the passenger, send an update to a data store, the update indicating that the passenger is in possession of: the mobile device battery or the mobile device charger, and the mobile device or the SIM card; and
- receive, from a second driver computing device, a notification that the passenger has returned: the mobile device battery or the mobile device charger, and the mobile device or the SIM card to a second driver associated with the second driver computing device, and
- update the data store to indicate that the passenger has returned: the mobile device battery or the mobile device charger, and the mobile device or the SIM card.

\* \* \* \* \*